United States Patent

[11] 3,602,184

| [72] | Inventor | Edward James Gratrex<br>Bracknell, England |
|---|---|---|
| [21] | Appl. No. | 808,171 |
| [22] | Filed | Mar. 18, 1969 |
| [45] | Patented | Aug. 31, 1971 |
| [73] | Assignee | Premier Precision Limited<br>Bracknell, England |
| [32] | Priority | Mar. 25, 1968 |
| [33] |  | Great Britain |
| [31] |  | 14232/68 |

[54] DRIVING UNITS
12 Claims, 6 Drawing Figs.

[52] U.S. Cl. ................................................. 115/41
[51] Int. Cl. ..................................................... B63h 23/26
[50] Field of Search............................................ 115/41, 34,
34 A; 308/9, 122

[56] References Cited
UNITED STATES PATENTS
1,607,318  11/1926  Spillmann...................... 308/9

| 2,445,369 | 7/1948 | Shields | 115/34 (X) |
| 2,570,682 | 10/1951 | Imbert | 308/9 |
| 2,578,711 | 12/1951 | Martellotti | 308/122 |
| 2,766,715 | 10/1956 | Waterval | 115/34 (X) |
| 3,139,062 | 6/1964 | Keefe | 115/34 (X) |
| 2,749,874 | 6/1956 | Klatte | 115/34 (X) |

FOREIGN PATENTS

| 893,407 | 4/1962 | Great Britain | 115/34 |
| 947,500 | 1/1964 | Great Britain | 115/34 |

*Primary Examiner*—Milton Buchler
*Assistant Examiner*—Carl A. Rutledge
*Attorney*—Browne, Schuyler and Beveridge

ABSTRACT: A stowable marine propulsion unit having a propeller shaft with a propeller at one end, a thrust bearing to resist axial movement of the propeller shaft and an axial piston hydrostatic motor positioned between the thrust bearing and the propeller.

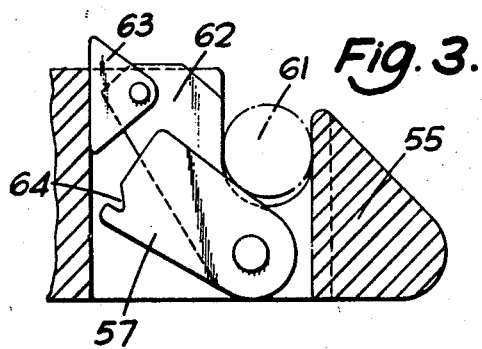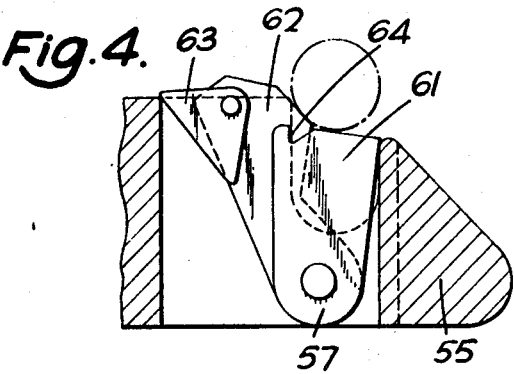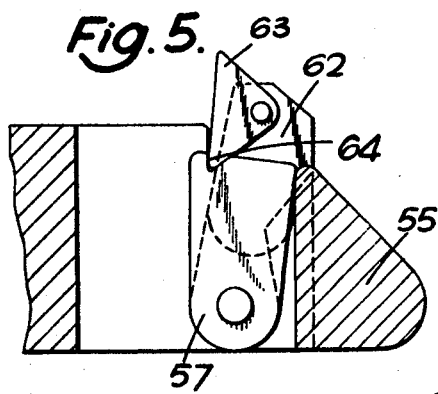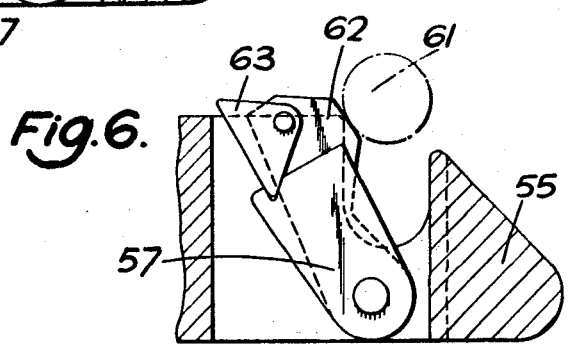

DRIVING UNITS

The invention relates to driving units.

The invention provides a driving unit which comprises a propeller shaft rotatably mounted at at least two spaced positions along its length, a propeller device mounted at one end of the shaft, a thrust bearing device acting on the shaft at or near the other end to resist axial movement of the shaft and a hydrostatic motor positioned between the thrust bearing device and the propeller device and the propeller device and adapted to rotate the shaft and thereby the propeller device.

Preferably the thrust bearing device is a hydrostatic thrust bearing and the hydrostatic motor is an axial piston hydrostatic motor.

Advantageously the propeller shaft extends continuously between the thrust bearing and the propeller device.

Preferably the hydrostatic motor surrounds part of the length of the propeller shaft between the thrust bearing and the propeller.

Preferably one bearing of the propeller shaft is positioned between the motor and the thrust bearing and the other bearing is positioned between the motor and the propeller.

Preferably the liquid for operating the hydrostatic motor is oil and fluid flow paths are provided to allow limited flow of oil from the cylinders of the motor to lubricate the moving parts of the unit.

Conveniently the unit is mounted in a streamlined casing from which the propeller projects at one end and the casing may be filled by operating liquid at a pressure slightly higher than the external water pressure.

Preferably a flexible coupling is provided for transmitting the torque from the motor to the propeller.

Preferably the unit is mounted on a support structure attached to a boat so that the unit can be positioned under water.

Preferably the unit is mounted on the support structure for attachment to a boat so that the unit can be positioned under water when in use on a boat, which support structure is pivotable to enable the unit to be both pivotally inclined and held in an uplifted position out of the water and also held in a stowed position out of the water.

A specific embodiment of the invention will be described by way of example and with reference to the accompanying drawings in which:

FIG. 2 shows a side view of the propulsion unit and a mounting in three alternative positions and FIGS. 3-6 show detailed side views of a locking device for supporting the mounting in a position shown in FIG. 2.

This example provides a propulsion unit which is particularly suitable for marine propulsion.

Figure 1:
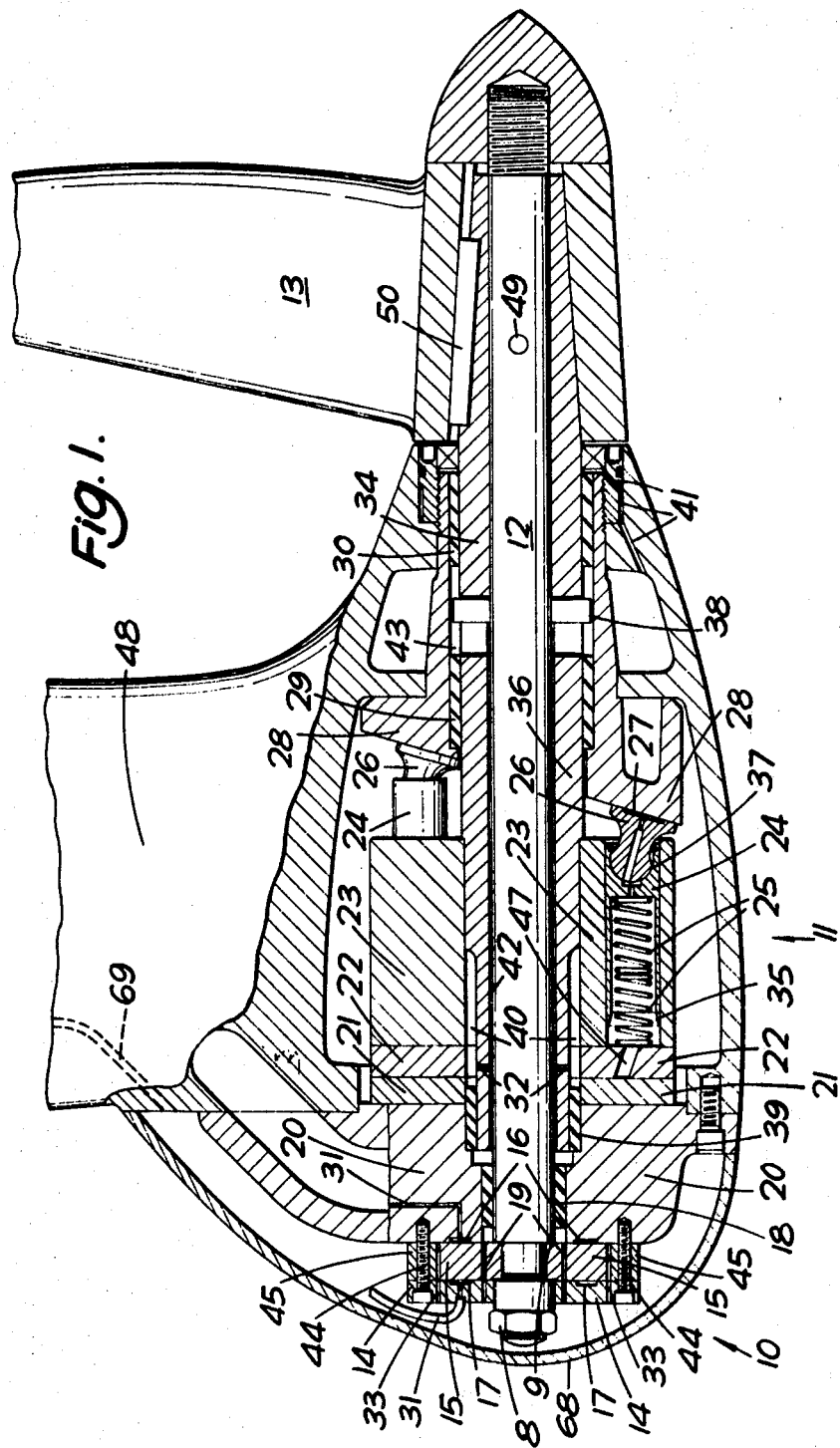
FIG. 1 shows a cross section along the axis of a propulsion unit.

Referring to FIG. 1 there is shown a section through a propulsion unit. The unit has a propeller shaft 12 passing continuously through the whole length of the unit. Fixed to one end of the shaft 12 is a balanced hydrostatic thrust bearing generally indicated at 10 and at the other end is fixed a propeller 13. Between the hydrostatic thrust bearing 10 and the propeller 13 is mounted about the propeller shaft axis an axial piston hydrostatic motor 11.

The balanced hydrostatic thrust bearing consists of a disc 15 which is nipped between a shoulder 9 of the shaft 12 and a nut 8 so that the disc 15 rotates with the shaft 12 between a manifold casting 20 and a plate 14. The plate 14 is bolted to the manifold casting 20 by bolts 44. Cut into the manifold casting 20 adjacent to the rotating disc 15 is an annular groove 16. On the other side of the rotating disc 15 is a similar annular groove 17 cut into the plate 14. Oil at a high pressure is fed from a high pressure oil supply also used for the motor, to the annular grooves 16 and 17 via capillary feeds 31. The disc 15 fits closely between the manifold casting 20 and the plate 14, typically with a clearance of a few ten thousandths of an inch, this clearance being determined by the thickness of spacing ring 45. A small amount of oil will flow from the annular grooves 16, 17 through this small clearance and drain away through drainage holes 33 and 19. The disc 15 is balanced by the same oil pressure on both sides.

When a thrust acts along the propeller shaft, the disc 15 will be displaced slightly one way or the other depending on the direction of the thrust. The displacement of the disc 15 will however increase the clearance between the disc and one side (14 or 20) and decrease the clearance on the other side of the disc 15. Hence the oil will flow faster on one side and the pressure of the oil will drop on that side; on the other side the flow will be slowed down and the oil pressure will build up thus balancing the thrust along the shaft in whichever direction the thrust acts. In this way the bearing resists axial movement of the shaft 12 in both axial directions.

The axial piston hydrostatic (swash plate) motor 11 has a cylinder block 23 through which are bored nine cylinders 35 spaced around the axis of the shaft 12. The cylinders 35 pass straight through the cylinder block 23 from end to end and a cylinder head 22 is bolted onto one end of the cylinder block 23. Between the manifold casting 20 and the cylinder head 22 is a port plate 21. Kidney-shaped holes 47 are so arranged in the cylinder head 22 (which rotates with the motor), and in the port plate 21 (which remains stationary), that they align so as to deliver high pressure oil to the cylinders, or allow oil to escape at the appropriate times during each cycle. The cylinder block 23 is fixed to a hollow motor shaft 36 so as to rotate with the motor. The cylinders 35 are provided with pistons 24. Springs 25 abut against the cylinder head 22 and the piston 24 to hold slippers 26 against the swash plate 28 when the motor is not in operation.

The slippers 26 are joined to the pistons 24 by part spherical bearings 37 in cups in the pistons 24 so that the slippers 26 will always press flat against the swash plate 28. Capillary oil feeds are provided through the pistons 24 and slippers 26 into gaps 27 in the slippers 26 so that the slippers 26 move over the swash plate on a film of oil.

The torque from the motor on the hollow motor shaft 36 is transmitted to the sleeve 34 by a flexible coupling 38. Sleeve 34 is coupled to the propeller shaft 12 by a pin 49 and the propeller 13 is mounted on the sleeve 34. The torque which is transmitted to the sleeve 34 by the flexible coupling 38 from the hollow motor shaft 36 is transmitted to the propeller 13 by a key 50 which is sunk into the sleeve 34 to engage with a slot in the propeller 13. The thrust on the propeller 13, which can be very uneven is taken by the propeller shaft 12 and the shaft 12 is able to resist axial movement by virtue of the hydrostatic thrust bearing 10. The hollow motor shaft 36 runs on journal bearings 29 and 39 and is separate from the propeller shaft 12 that passes through it.

The propeller shaft 12 runs on journal bearings 18 and 30 which are spaced as far apart as possible in order to give the maximum stability to the shaft 12 which can be subjected to very uneven forces in use.

Channels are provided to feed oil which flows from between the port plate 21 and cylinder head 22 to the journal bearings 18, 39, 29 and 30. Oil which flows from between the port plate 21 and the cylinder head 22 flows into a gap 40 and lubricates bearing 39. The oil also flows through radial holes 32 and along the gap 42 between the propeller shaft 12 and the hollow motor shaft 36. It lubricates the coupling 38 and flows into a gap 43 where it lubricates the bearings 29 and 30. The oil is allowed to leak from bearing 30 by means of a final leak-away channel 41.

The whole propulsion unit is arranged to be in a streamlined casing 68 mounted at the end of a mounting 48, and with the propeller 13 projecting from one end of the unit, as shown in FIG. 1. Hoses indicated schematically at 69 enter the unit through the mounting 48 to feed the oil required to operate the motor to and from the unit.

As the propulsion unit is supplied by high pressure oil through flexible hoses 69, the unit can be mounted completely under water underneath a boat whilst the boat's engines, which provide the high pressure oil, may be placed at any convenient position in the boat.

The casing of the unit is completely filled with oil at a pressure slightly higher than that of the external water pressure.

Figure 2:
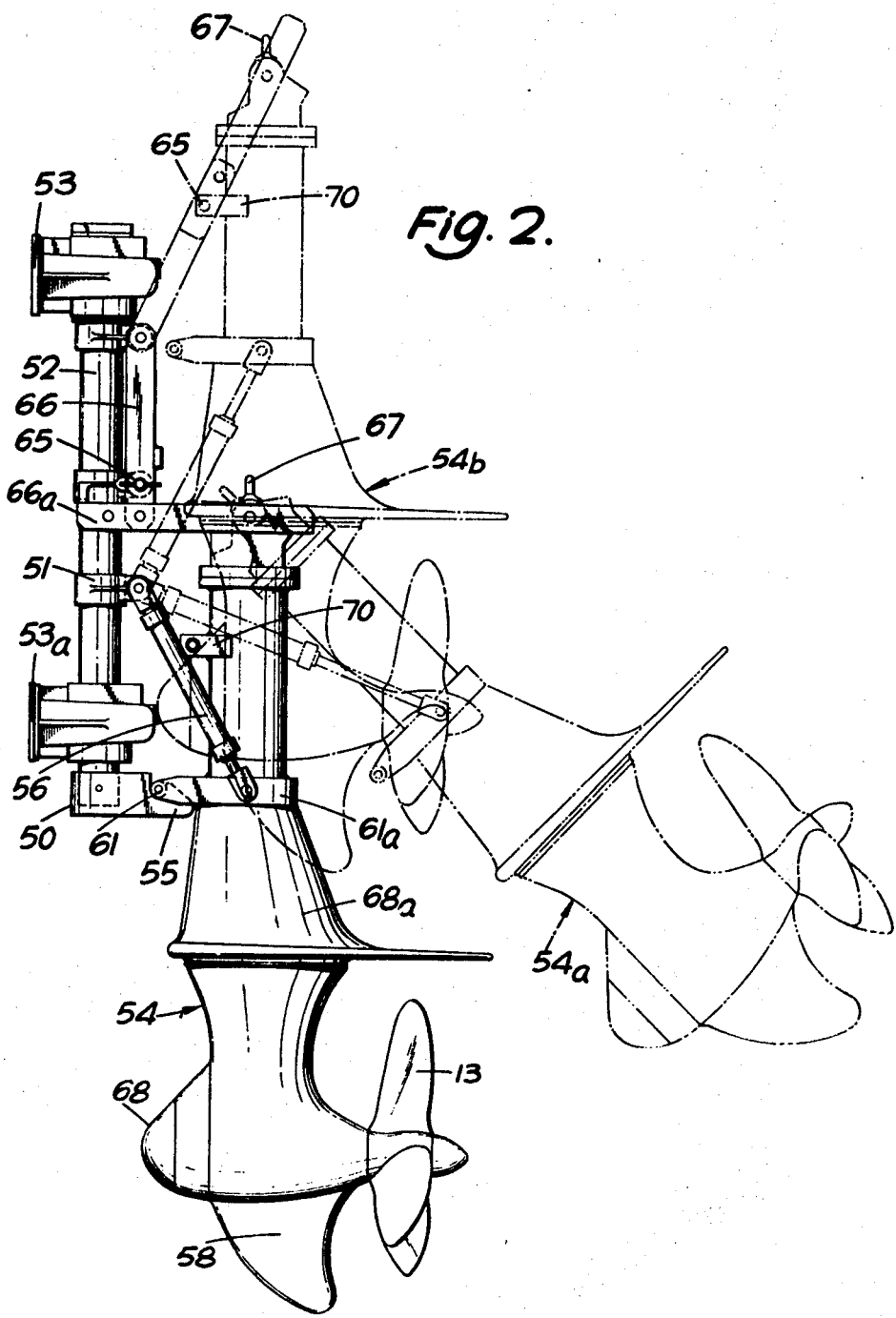

It will be appreciated that the whole propulsion unit consisting of the casing 68 at the end of a supporting shaft 68a can be pivotally mounted upon a boat and accordingly three alternative positions for the unit are shown in FIG. 2.

Referring to FIG. 2, supports 53, 53a are provided for mounting the whole unit upon the boat. The two supports 53, 53a are joined by a bar 52 and attached to the bar 52 are supports 50, 51 for mounting the whole unit on the bar 52.

In the normal position to drive the boat the unit is immersed below water substantially in the position generally indicated at 54 in FIG. 2. In this position hydraulic cylinders 56 on each side of the unit are used to resist any upward thrust on the unit which may result from pitching of the boat in rough water. When for any reason it is desired to lift the unit from the normal driving position 54 to an uplifted position 54a, for example when the skeg 58 protecting the propeller has struck an obstruction, the hydraulic cylinders 56 can be operated to lift the unit to position 54a. The hydraulic cylinders 56 can be arranged to lift the unit automatically upon the skeg 58 striking an obstruction or alternatively manually at any other time. Finally the unit may be placed in a third stowed position generally indicated at 54b in which the unit is lifted entirely from the water.

When the unit is in the position 54 (i.e. in the normal driving position) the unit is supported both by two hydraulic cylinders 56 on each side of the unit and by a locking device shown in greater detail in FIG. 3. In FIG. 3 a hook 55 engages a roller 61. The roller 61, attached to the unit by crossmember 61a, is engaged by the hook 55, lever 62 and stop member 57. The unit is thus rigidly held against all but vertical thrust and since as aforesaid the upwards thrust is reduced or eliminated by the hydraulic cylinders 56 the unit is locked in the normal driving position. When it is desired to move the unit into the second uplifted position 54a the hydraulic cylinders 56 first retract. Referring to FIG. 4 the roller 61 is disengaged from hook 55, lever 62 and stop member 57. When roller 61 has disengaged from hook 55 stop member 57 is moved by spring action into position below roller 61 so that roller 61 is prevented from reengaging hook 55. The hydraulic cylinders 56 now extend to swing the unit from the water. When the hydraulic cylinders 56 have ceased extending, lever 62 carrying pawl 63 is moved by spring action until pawl 63 engages a notch 64 in stop member 57 as shown in FIG. 5. In order to return the unit to the normal driving position the hydraulic cylinders 56 retract to lower the unit. Roller 61 engages with lever 62 which is pushed back carrying with it stop member 57 which is engaged to lever 62 by pawl 63 as shown in FIG. 6. When roller 61 reaches its engaged position pawl 63 is disengaged from stop member 57 by the engagement of pawl 63 with the rear face of hook 55. The roller 61 can now reengage with hook 55 so that the unit is again in its normal driving position.

In order to stow the unit it is first necessary to bring the unit to the uplifted position 54a. A locking pin 65 is then removed from a top link 66. Links 66 and 66a are then brought into line and locked together on one side by pin 65.

The propulsion unit is then lifted by means of an eye bolt 67 to the stowed position 54b and locked in this position by pushing pin 65 through the lug 70 on the body of the unit. The unit is now locked in the stowed position 54b.

This propulsion unit is especially suitable for retractable bow-thruster units, for maneuvering vessels with little or no forward speed. It will be appreciated that the whole unit can be rotated about a vertical axis for steering. This example has applications for the propulsion of craft with power and speed requirements which do not come within the economical range of either outboard or existing stern drive units. It can also be used for the propulsion of hydrofoil type craft where the varying angle and vertical distance between hydrofoils and hull introduce considerable difficulties for mechanical transmission systems. A hydrostatic drive unit could be built into each hydrofoil.

The invention is not limited to the details of the foregoing example.

I claim:

1. A propeller driving unit comprising, a housing, a propeller, a shaft, means mounting said propeller onto said shaft, a thrust bearing mounted in said housing and operatively connected to said shaft for resisting axial movement of said propeller and said shaft, a hydrostatic motor mounted in said housing and flexible coupling means rotationally coupling said motor to said shaft, but permitting limited axial movement of the shaft with respect to the motor.

2. A propeller driving unit as defined in claim 1 in which the liquid for operating said hydrostatic motor is oil, and further comprising fluid flow paths to allow a limited flow of oil from said motor to lubricate the moving parts of the unit.

3. A propeller driving unit as claimed in claim 2 wherein said housing is filled with oil at pressure slightly higher than the external water pressure.

4. A propeller driving unit as defined in claim 1 wherein said hydrostatic motor is an axial piston motor, and wherein said shaft extends through said motor.

5. A propeller driving unit as claimed in claim 1 wherein said flexible coupling comprises a first sleeve connected to said motor to be driven thereby, a second sleeve, a resilient coupling between said first and second sleeves to permit said relative axial movement but rotatably coupling said sleeves, and means connecting said shaft to said second sleeve for rotation therewith.

6. A propeller driving unit as claimed in claim 5 wherein said hydrostatic motor is a swashplate motor mounted on said first sleeve and having a swashplate fixed in said housing.

7. A propeller driving unit as claimed in claim 6 and having a rotational bearing for said shaft positioned between said motor and said thrust bearing and a second bearing positioned between the motor and the propeller.

8. A propeller driving unit comprising a housing, a hydrostatic motor within said housing, a first sleeve rotatably mounted within and housing and operatively connected to said motor to be driven thereby, a second sleeve, a propeller rigidly secured to said second sleeve to be driven thereby, flexible coupling means coupling said sleeves to rotate together while permitting limited axial movement therebetween, a shaft rigidly secured to said second sleeve, and a thrust bearing within said housing for resisting axial movement in either direction of said shaft.

9. A propeller driving unit as claimed in claim 8 wherein said shaft, at one end is secured to said second sleeve and extends through said first sleeve, said thrust bearing being at the other end of said shaft.

10. A propeller driving unit as claimed in claim 8 wherein said first and second sleeves are coaxial and are spaced apart axially by said flexible coupling means.

11. A propeller driving unit as claimed in claim 5 wherein said shaft extends through said second sleeve, and wherein said means connecting said shaft to said second sleeve comprises a transverse pin engaging said shaft and said second sleeve.

12. A propeller driving unit as defined in claim 11 wherein said propeller is mounted on said second sleeve, and further comprising a key on said second sleeve engaging an axially extending slot in said propeller.